July 29, 1941.   N. C. GROSS   2,250,707
SAUSAGE STUFFER
Filed Oct. 27, 1938   2 Sheets-Sheet 2

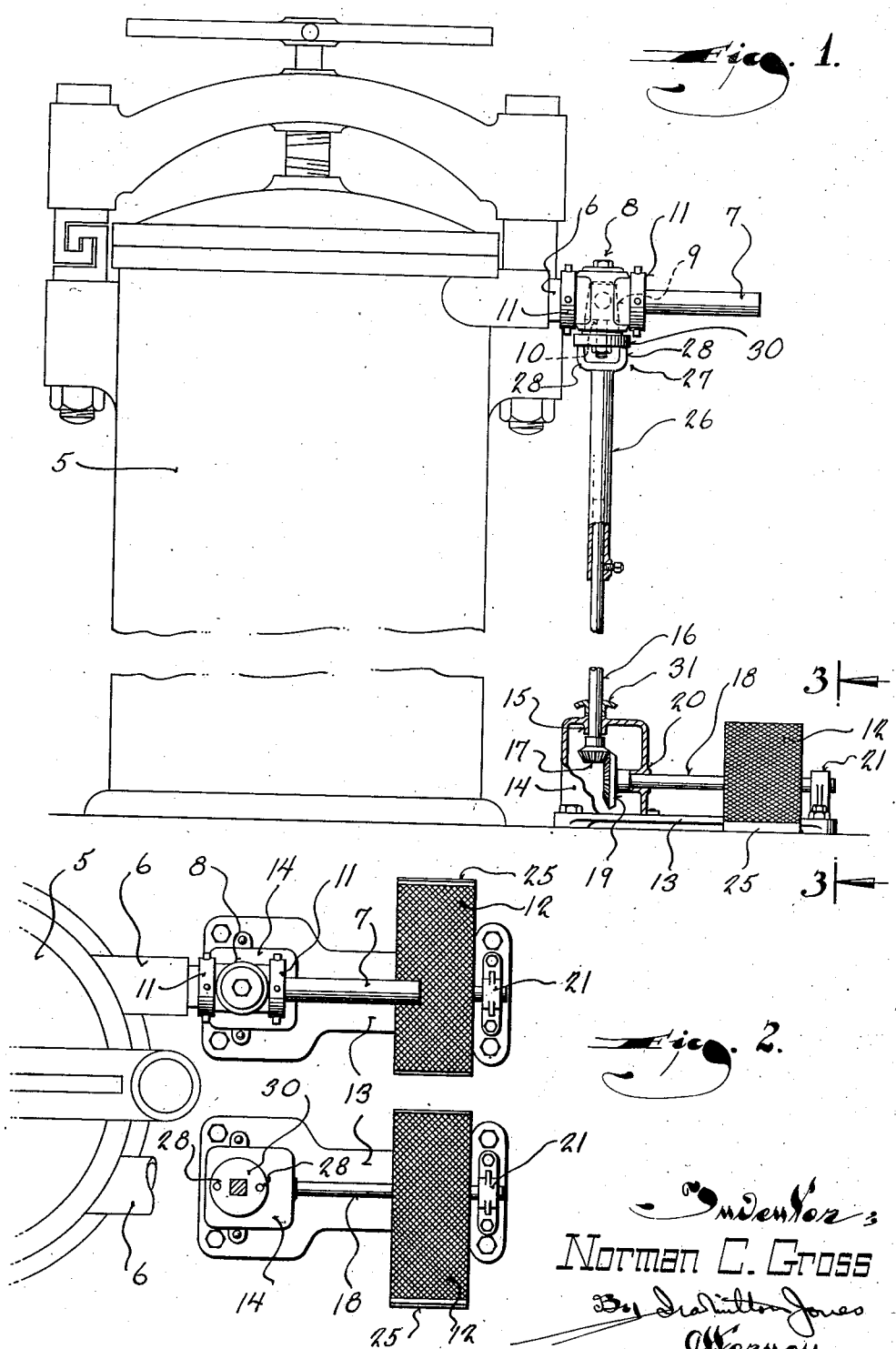

Inventor
Norman C. Gross

Patented July 29, 1941

2,250,707

UNITED STATES PATENT OFFICE 2,250,707

SAUSAGE STUFFER

Norman C. Gross, Milwaukee, Wis.

Application October 27, 1938, Serial No. 237,180

8 Claims. (Cl. 17—35)

This invention relates to sausage stuffing apparatus and refers more particularly to the manner of controlling the discharge of sausage meat therefrom.

Apparatus of this kind in the past has generally consisted of a container for holding a supply of ground sausage meat under pressure for extrusion through one or more valved discharge tubes or nozzles into sausage casings applied thereto. The valves for controlling the discharge of the sausage meat were hand operated so that the operator attending the apparatus was obliged to use one hand for valve control. This handicapped the operator, for it is difficult to properly manipulate the casing during the filling or stuffing thereof.

This invention, therefore, has as one of its objects to provide means for controlling the valve in the tube or nozzle whereby both of the operator's hands will be free for manipulation of the sausage casing.

More particularly, it is an object of this invention to provide a sausage stuffing apparatus of the character described in which the nozzle valve is controlled by means of a foot treadle on the floor adjacent to the stuffer.

Another object of this invention is to provide a sausage stuffing apparatus of the character described with a foot operated valve control which may be readily adjusted angularly with respect to the stuffing tube and its valve to enable positioning the same in the most convenient position for the operator.

A further object of this invention is to provide a readily separable connection between the foot operated valve controlling means and the valve to enable quick detachment of the valve for cleaning.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a view in elevation of a sausage stuffing machine illustrating the application of this invention thereto;

Figure 2 is a top view of the discharge control, as shown in Figure 1, having parts thereof broken away and in section;

Figure 3:
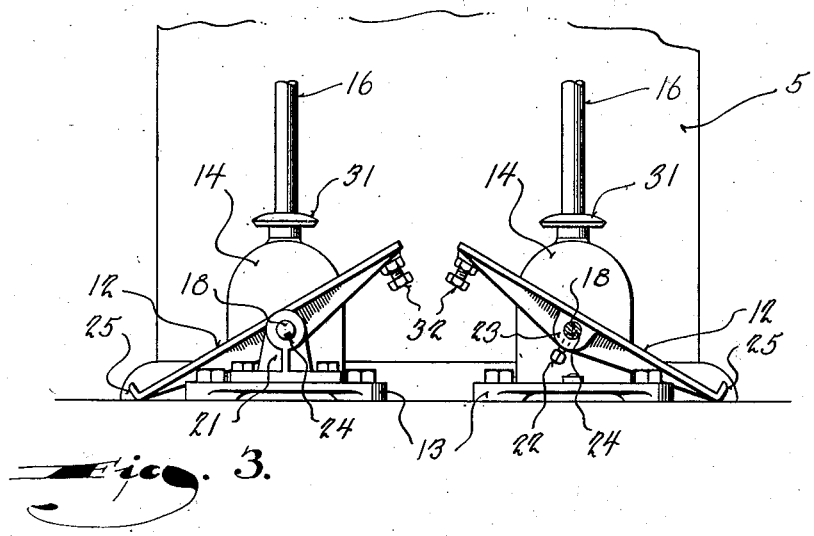
Figure 3 is a view taken on the line 3—3 of Figure 1, a part thereof being broken away to more clearly illustrate the manner of mounting the foot treadle.
Figure 4:
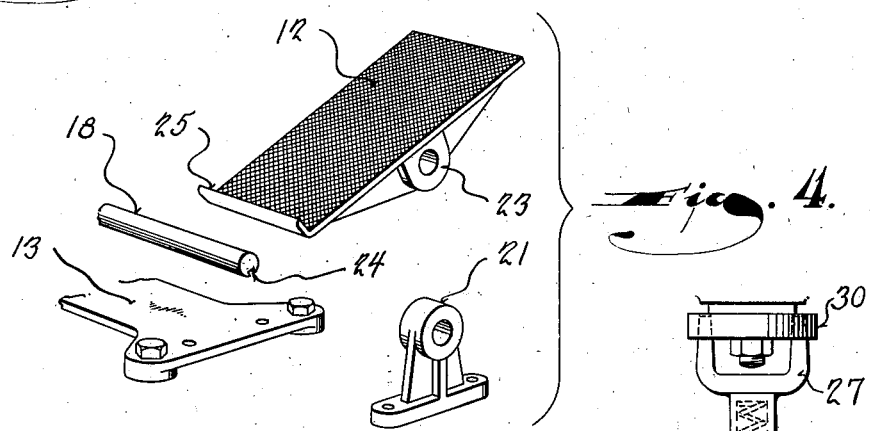
Figure 4 is a perspective view of the treadle and portions of its support.

Referring now particularly to the accompanying drawings, in which like numerals indicate like parts, the numeral 5 designates the container of a conventional sausage stuffer which is adapted to hold a supply of ground sausage meat under pressure. At its upper end the container may be provided with one or more outlets 6 and in the present instance, two are shown.

Connected with each of the outlets 6 is a discharge tube or nozzle 7 upon which a casing (not shown) is adapted to be positioned to receive the material issuing therefrom. A valve 8 interposed between each of the outlets 6 and its discharge tube or nozzle 7 controls the extrusion of material therefrom.

Inasmuch as the control for each of the nozzles is identical, a description of one will suffice for both.

The valve 8, as employed herein, may be of any conventional design and has a rotatable plug 9 mounted in the body of the valve with an exposed actuating stem 10 projecting downwardly therefrom.

Inasmuch as equipment of this nature must be cleaned frequently, it is essential that its various parts be capable of quick disassembly. To this end, the valve is detachably mounted between the outlet 6 and the nozzle 7 by nut members 11 which connect the opposite sides of the valve with the outlet and nozzle, respectively.

The valve plug is actuated by means of a foot treadle 12 connected with the valve plug in a manner to be hereinafter described. The treadle is mounted on a flat base plate 13 adjustably securable to the floor in any one of a number of predetermined positions with respect to the discharge nozzle.

Carried at one end of the base plate is a gear box 14 substantially in vertical alignment with the valve plug 9. This gear box has a bearing 15 in its top wall in which a vertically disposed shaft 16 is journalled; and fixed to the lower end of the shaft 16 inside the gear box is a bevel gear 17.

A horizontal shaft 18 extending longitudinally along the length of the base plate, but spaced therefrom, extends into the gear box 14 and has a bevel gear 19 mounted thereon to mesh with the bevel gear 17. The shaft 18 is suitably journalled in a bearing 20 carried by the side wall of the gear box and at its opposite end by a bearing bracket 21 secured to the base plate.

The foot treadle 12 is removably secured to the shaft 18 by means of a set screw 22 threaded into the hub 23 of the treadle and engaging in a keyway 24 in the shaft. The treadle 12 is substantially medially mounted on the shaft 18 and has a flange 25 at one end against which the heel of the operator may engage for proper positioning of the operator's foot on the treadle.

When the valve is closed, the flanged end of the treadle engages the floor and its toe portion is elevated. Hence, depression of the toe portion opens the valve. This follows from the fact that the vertically disposed shaft 16 is drivingly connected with the valve plug.

The connection between the shaft 16 and the valve plug is readily separable to enable the valve to be removed and is adjustable to permit the positioning of the treadle as desired. To this end, the connection comprises a tube 26 slidably carried by the shaft 16 and secured thereto by set screws or the like. At its upper end, this tube carries a fork-like member 27, the prongs 28 of which are adapted to engage in holes 29 in a collar 30 fixed to the valve plug actuating stem 10, upon sliding the tube 26 on the shaft 16 toward the collar.

Inasmuch as it is difficult to restore the valve to exactly the same position each time it is replaced after cleaning, it is necessary that the connection between the valve plug and the tube 26 shall accommodate a degree of misalignment between these parts. To this end, the prongs 28 are tapered, as shown so that in establishing the connection they enter the holes 29 the proper distance to provide a connection free from play and binding even though the collar may not be directly perpendicular to the axis of the vertical shaft and tube.

Adjustment of the position of the treadle with respect to the discharge tube or nozzle 7, may be readily accomplished by loosening the set screw which secures the tube 26 to the shaft 16. This allows the connection between the valve plug and the tube 26 to be broken, whereupon the entire base plate and treadle may be moved angularly with respect to the nozzle about the axis of the valve plug 9. It is only necessary after such adjustment to reestablish the connection between the tube 26 and the valve collar 30, lock the tube to the shaft 16, and secure the base plate to the floor.

To insure noiseless operation, the gear box 14 is adapted to hold a supply of lubricant which also prevents wear on the bevel gears. The gears are further protected by an apron 31 at the point where the shaft 16 enters the gear box. This apron sheds salt water and other harmful liquids and prevents their entrance into the gear box.

As noted hereinbefore, the valve is closed when the heel portion of the treadle is down and is opened by depression of the toe. To insure that the treadle will be moved the proper distance to bring the valve plug accurately to its open position, an adjustable stop 32 is fixed to the toe portion of the treadle to limit its descent.

Figure 6:
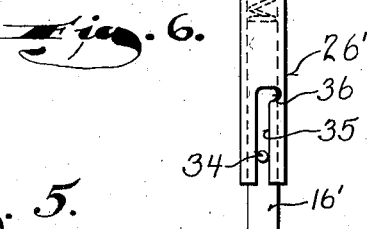
Figure 6 is a detail view illustrating a modified manner of connecting the actuator with the valve.
Figure 5:
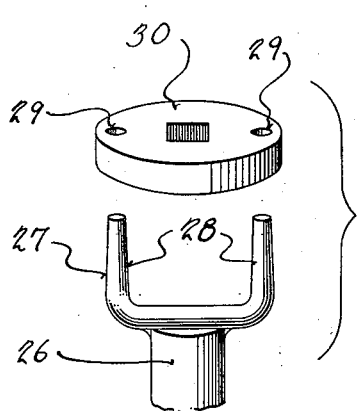
Figure 5 is a perspective view illustrating the universal joint connection employed to actuate the valve.

If desired, a modified construction may be employed for the connection between the valve and its actuator as illustrated in Figure 6. This construction comprises a shaft 16' similar to the shaft 16 and likewise rotatable by actuation of the foot pedal, and a tube 26' telescoped over the upper end of the shaft and yieldingly urged outwardly thereof by a spring 33 confined between the upper end of the shaft 16' and the closed upper end of the tube 26'.

The upper end of the tube carries the yoke 27, the prongs of which engage in the holes 29 of the disc 30 which is secured to the valve plug.

A nonrotatable though longitudinally movable driving connection is established between the shaft 16' and the tube 26' by means of a pin 34 fixed in the shaft and slidable in a longitudinal slot 35 in the lower end of the tube.

The upper end of the slot is laterally enlarged to provide a locking recess 36 for reception of the pin 34 so that the tube may be releasably held in its depressed position holding the fork 27 clear of the valve disc 30.

An advantageous feature of this invention is the fact that the controls for both discharge tubes or nozzles are identical and interchangeable one with the other which obviously reduces the number of different parts required.

From the foregoing description taken in connection with the accompanying drawings, it will be readily apparent to those skilled in the art, that by enabling the operator to have both hands free for manipulation of the sausage casings, a very material improvement has been effected in sausage stuffing equipment.

What I claim as my invention is:

1. In a sausage stuffer having a discharge nozzle through which plastic material such as sausage meat may be extruded under high pressure into a sausage casing applied to the nozzle: a valve for controlling the passage of such plastic material through the nozzle comprising, a valve body having an inlet and an outlet; a rotatable plug in the valve body having a port for connecting the inlet and outlet in one position of rotation; means for positively turning the plug in both directions including a driven rotatable shaft; and a readily separable driving connection between the shaft and the plug comprising, cooperating parts on the shaft and plug engageable with a wedge-like action upon relative axial movement between the shaft and plug in one direction to take up play between the shaft and plug.

2. In a sausage stuffer having a discharge nozzle through which plastic material such as sausage meat may be extruded under high pressure into a sausage casing applied to the nozzle: a valve for controlling the passage of such plastic material through the nozzle comprising, a valve body having an inlet and an outlet; a rotatable plug in the valve body having a port for connecting the inlet and outlet in one position of rotation; foot operated means for positively turning the plug from open to closed position and vice versa including a drive shaft; and a connection between the drive shaft and the rotatable plug comprising, cooperating parts on the plug and shaft engageable with a wedge-like action to take up play between the shaft and the plug.

3. In a sausage stuffer having a discharge nozzle through which plastic material such as sausage meat may be extruded under high pressure into a sausage casing applied to the nozzle: a valve for controlling the passage of such plastic material through the nozzle comprising, a valve body having an inlet and an outlet; a rotatable plug in the valve body having a port for connecting the inlet and outlet in one position of rotation; foot operated means for positively turning the plug from open to closed position and vice versa including a rotatable drive shaft and a separable driving connection between the shaft and the rotatable plug comprising, a part fixed to the plug and having a plurality of holes; and a fork-like part carried by the shaft with its prongs engageable in the holes upon movement of one of said parts toward the other, said prongs being taperingly pointed toward the ends thereof so that motion of the fork toward the plug takes up play in the driving connection.

4. In a sausage stuffer having a discharge nozzle through which plastic material such as sausage meat may be extruded under high pressure into a sausage casing applied to the nozzle: a valve for controlling the passage of such plastic material through the nozzle comprising, a valve body having an inlet and an outlet; a rotatable plug in the valve body having a port for connecting the inlet and outlet in one position of rotation; foot operated means for positively turning the plug from open to closed position and vice versa including a shaft rotatable upon actuation of said foot operated means; and a driving connection between the shaft and the rotatable plug comprising, a part carried by the plug and another part carried by the shaft, one of said parts having tapered prongs engageable with a wedge-like action in recesses in the other part to take up play between the shaft and the plug.

5. In a sausage stuffer having a discharge nozzle through which plastic material such as sausage meat may be extruded under high pressure into a sausage casing applied to the nozzle: a valve for controlling the passage of such plastic material through the nozzle comprising, a valve body having an inlet and an outlet; a rotatable plug in the valve body having a port for connecting the inlet and outlet in one position of rotation; foot operated means for positively turning the plug from open to closed position and vice versa including a shaft rotatable upon actuation of said foot operated means; a readily separable driving connection between the shaft and the rotatable valve plug; and yieldable means for maintaining said driving connection.

6. In a sausage stuffer having a discharge nozzle through which plastic material such as sausage meat may be extruded under high pressure into a sausage casing applied to the nozzle: a valve for controlling the passage of plastic material through the nozzle comprising, a valve body having an inlet and an outlet; a rotatable plug in the valve body having a port for connecting the inlet and outlet in one position of rotation; foot operated means for positively turning the plug from open to closed position and vice versa including a shaft rotatable upon actuation of said foot operated means; a readily separable driving connection between the shaft and the rotatable valve plug comprising a part carried by the plug and another part connected with the plug carried part and the shaft and separable from the plug carried part upon motion thereof toward the shaft; and a spring between the shaft and said last named part for readily releasably maintaining said driving connection by opposing motion of said last named part towards the shaft.

7. In a sausage stuffer having a discharge nozzle through which plastic material such as sausage meat may be extruded under high pressure into a sausage casing applied to the nozzle: a valve for controlling the passage of such plastic material through the nozzle comprising, a valve body having an inlet and an outlet; a rotatable plug in the valve body having a port for connecting the inlet and outlet in one position of rotation; foot operated means for positively turning the plug from open to closed position and vice versa including a shaft rotatable upon actuation of said foot operated means; a part fixed with respect to the rotatable valve plug; a part slidably but nonrotatably mounted on the shaft, said parts having interengaging driving elements separable upon movement of the second named part toward the shaft; and a spring between the shaft and said second named part for yieldingly opposing such movement and maintaining the driving connection.

8. In a sausage stuffer having a discharge nozzle through which plastic material such as sausage meat may be extruded under high pressure into a sausage casing applied to the nozzle: a valve for controlling the passage of such plastic material through the discharge nozzle comprising, a valve body having an inlet and an outlet; a rotatable plug in the valve body having a port for connecting the inlet and outlet in one position of rotation; foot operated means for positively turning the plug from open to closed position and vice versa including a shaft rotatable upon actuation of said foot operated means; a part fixed with respect to the rotatable valve plug; a part slidably but nonrotatably mounted on the shaft, said parts having interengaging driving elements separable upon movement of the second named part toward the shaft; a spring between the shaft and said second named part for yieldingly opposing such movement and maintaining the driving connection; and means for releasably securing said second named part in a depressed position against the action of the spring.

NORMAN C. GROSS.